C. E. STRONG.
PACKING.
APPLICATION FILED MAY 7, 1913.
1,087,516.
Patented Feb. 17, 1914.
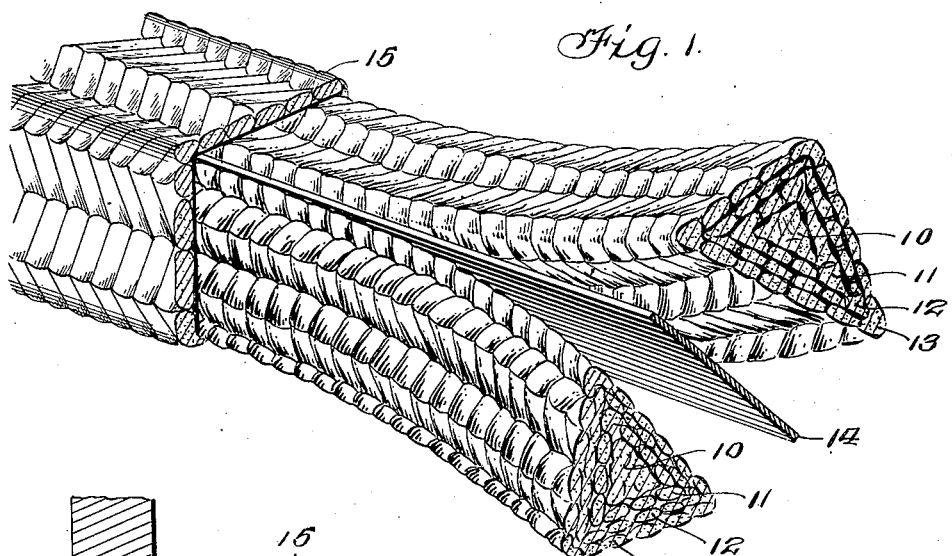
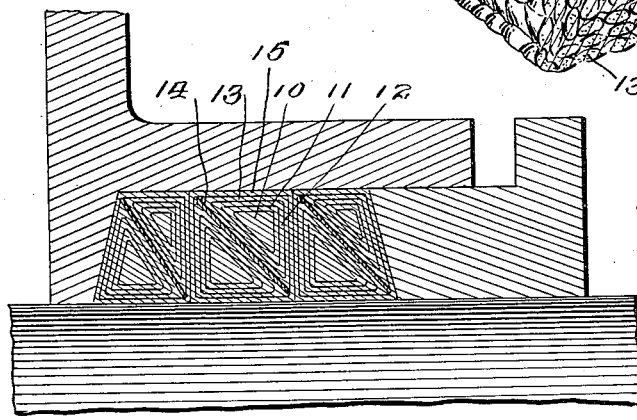
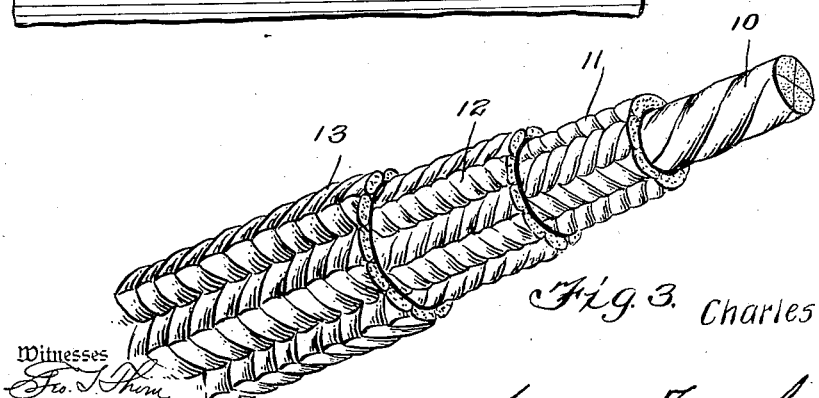
Inventor
Charles E. Strong

UNITED STATES PATENT OFFICE.

CHARLES E. STRONG, OF AMITYVILLE, NEW YORK.

PACKING.

1,087,516.  Specification of Letters Patent.  Patented Feb. 17, 1914.

Application filed May 7, 1913. Serial No. 766,187.

*To all whom it may concern:*

Be it known that I, CHARLES E. STRONG, a citizen of the United States, residing at Amityville, in the county of Suffolk and State of New York, have invented certain new and useful Improvements in Packings; and I do hereby declare the following to be a full, clear, and exact description of the invention, such as will enable others skilled in the art to which it appertains to make and use the same.

This invention relates to piston packing and has for an object to provide a packing which is braided so that it cannot be torn to pieces by the action of the piston.

Another object of this invention is the application of lubricant to the material forming the packing in the building up of the several braids.

A further object of this invention is a provision of a packing comprising two braided strips inclosed in an outer braid and between the two braided strips is placed a thin film of pliable but impervious material such as Babbitt metal.

A further object of this invention is a provision of a packing made of two sections which are triangular in cross section which sections have a wedging action against one another when pressure is exerted against the side of the packing as by a gland or similar coil of the packing.

A further object of this invention is the forming of a strand of packing as by taking a few strands of material saturating same with a lubricant, forming a braid about the first mentioned strand, applying lubricant to the first mentioned braid and repeating the braiding action for several times and in applying a lubricant with each application of the braid.

Further objects will be apparent from the following specification, appended claims and drawings, in which, Figure 1 is a perspective view of a piece of packing made in accordance with this invention showing the steps in the manufacture of the packing. Fig. 2 is a sectional view through the packing showing same applied, and Fig. 3 is a view of a portion of the packing before it is pressed into triangular shape.

This invention provides for a packing for steam engines of high speed and working under high steam pressures and it provides a packing which is braided so as to overcome the possibility of a tearing to pieces of the packing by the action of the piston and it is made of two triangular sections which exert a wedging action on each other under the pressure of the gland or the steam pressure so that in all cases, the packing action is improved. Furthermore, to assist in making the packing impenetrable to pressure as well as providing better movement of the wedge sections a strip of thin anti-friction metal such as Babbitt metal is interposed between the two wedge shaped members.

Referring to the drawings there is shown a strand of packing which is formed of the innermost strands of thread 10 such as asbestos thread which is lubricated and formed in a cord. The second step is the application of a braid 11 about this cord and this braid is likewise lubricated, then the repeated application of braids 12 and 13 to build up the desired size is carried on and with each new braid there is a treatment with lubricant. This strand of packing is then placed under pressure and forced into a triangular cross sectional shape shown in Fig. 1 of the drawings and in making up the finished packing these triangular strands of packing are placed against the opposite sides of a strip of Babbitt or similar anti-friction metal 14 around which a braid 15 is formed about the entire strand so as to form a rectangular cross sectional packing.

When the packing is placed in the stuffing box as shown in the drawings, it is clearly seen that it is impossible for steam or pressure to escape through the packing as the strip of anti-friction metal would prevent any such passage and it is also seen that by a braided packing it is impossible for the packing to tear to pieces because as it wears, the tightening of the gland will increase the pressure on the sides of the packing and by the triangular shape of the two sections will cause a wedging or binding action between the piston and the walls of the stuffing box. Also the application of lubricant on each new step in the manufacture of the braid forms a packing which is thoroughly saturated with lubricant.

Modifications may be made within the scope of this invention without departing from the spirit thereof and

Having thus described my invention, I claim:

1. In a packing, a plurality of strands formed of mineral fibers, a core of similar fibers, said strands being woven into triangular cross sectional lengths, said lengths being disposed against one another to present corresponding sides and a film of antifrictional metal disposed between said lengths to facilitate in the adaption of said strips to one another.

2. In a packing, a plurality of strands of mineral fiber, a core formed of some of said strands, a series of braids formed about said core, applications of lubricant to said core on each successive braid, said core and braids being formed into triangular cross sectional shape, a strip of anti-friction metal, and a strand of such packing applied to each side of said anti-friction metal, and a braid enveloping said strands of packing, anti-friction metal and lubricant, each braid being subsequently treated with lubricant.

3. In a packing, a plurality of strands of mineral fibers, a strip of anti-friction metal, said mineral fibers being formed into units of triangular cross sectional shape, said units being saturated with lubricant and said units being disposed on the opposite sides of said anti-friction metal and a braid of similar strands of mineral fiber formed about said units and anti-friction metal, said braid being treated with lubricant.

4. In a packing, a plurality of strands of mineral fiber and a strip of anti-friction metal, some of said fibers being formed in braids which braids are formed in triangular cross sectional shape, which triangular shaped braids are disposed on the opposite sides of the anti-friction metal, said braids being saturated with lubricant, a braid of similar strands enveloping the first mentioned braids and anti-friction metal, said exterior braids being treated with lubricant and the packing thus formed permitting a wedging action of the braids on the opposite sides of the anti-friction metal.

5. In a packing, the combination of a plurality of strands of mineral fibers formed into braids, an application of lubricant to each of said braids, a strip of anti-friction metal between said braids, and an exterior braid enveloping said first mentioned braids and anti-friction metal, said anti-friction metal permitting wedging action of said first mentioned braids and said anti-friction metal rendering said packing impervious to pressure therethrough.

In testimony whereof I affix my signature in presence of two witnesses.

CHARLES E. STRONG.

Witnesses:
LOUIS C. KISELKA,
JOSEPH A. LAMPE.